A. PENTECOST.
SPLIT MACHINE.
APPLICATION FILED AUG. 29, 1906.
1,126,851.
Patented Feb. 2, 1915.
3 SHEETS—SHEET 3.
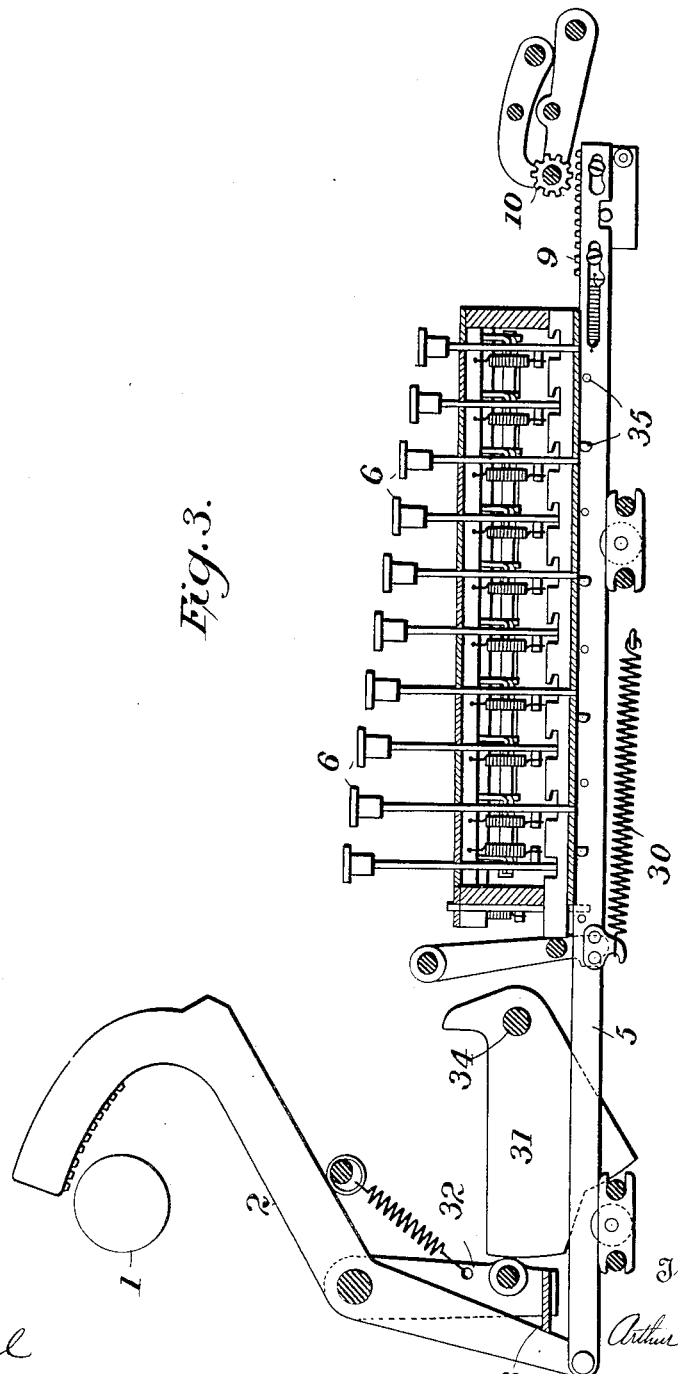

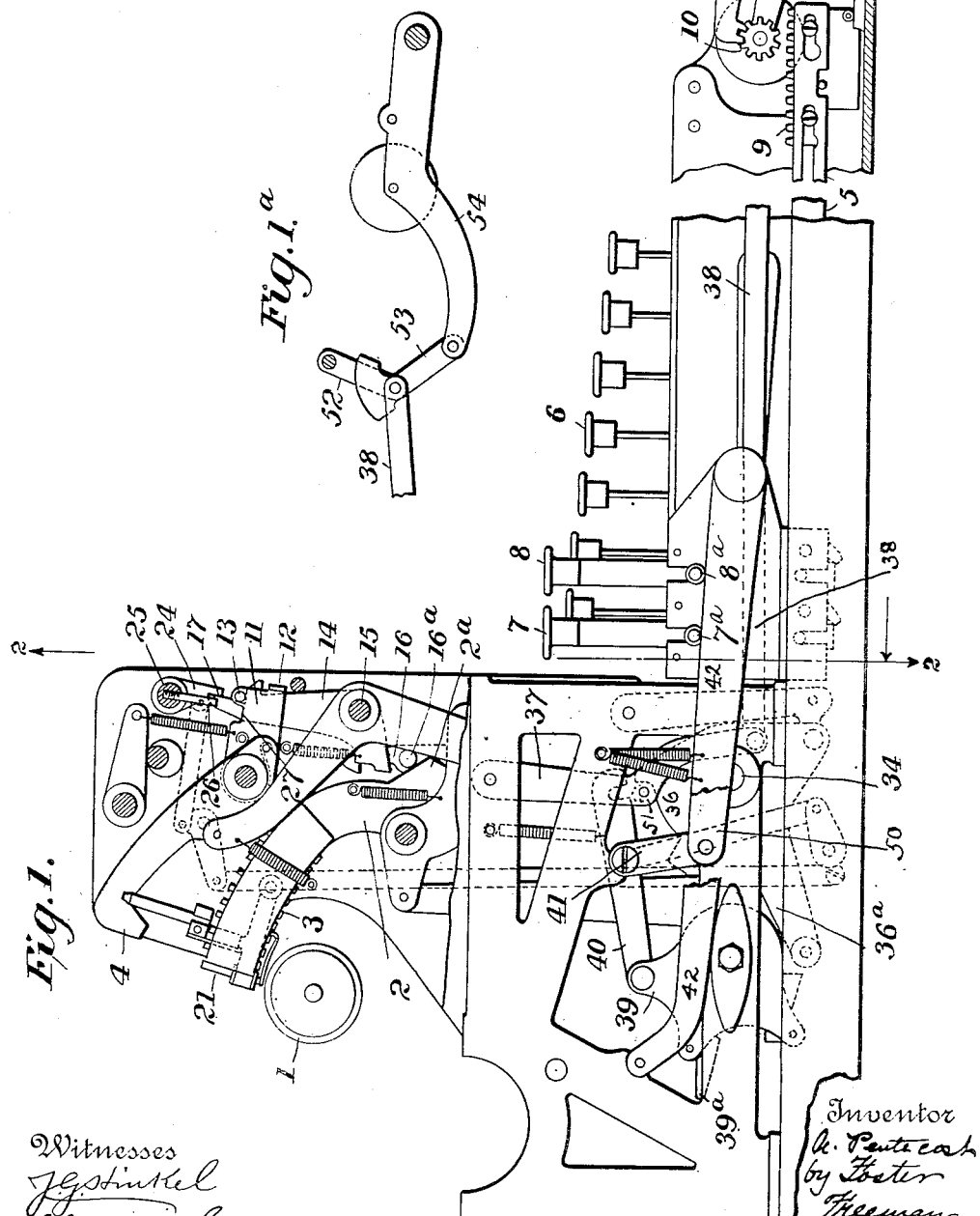

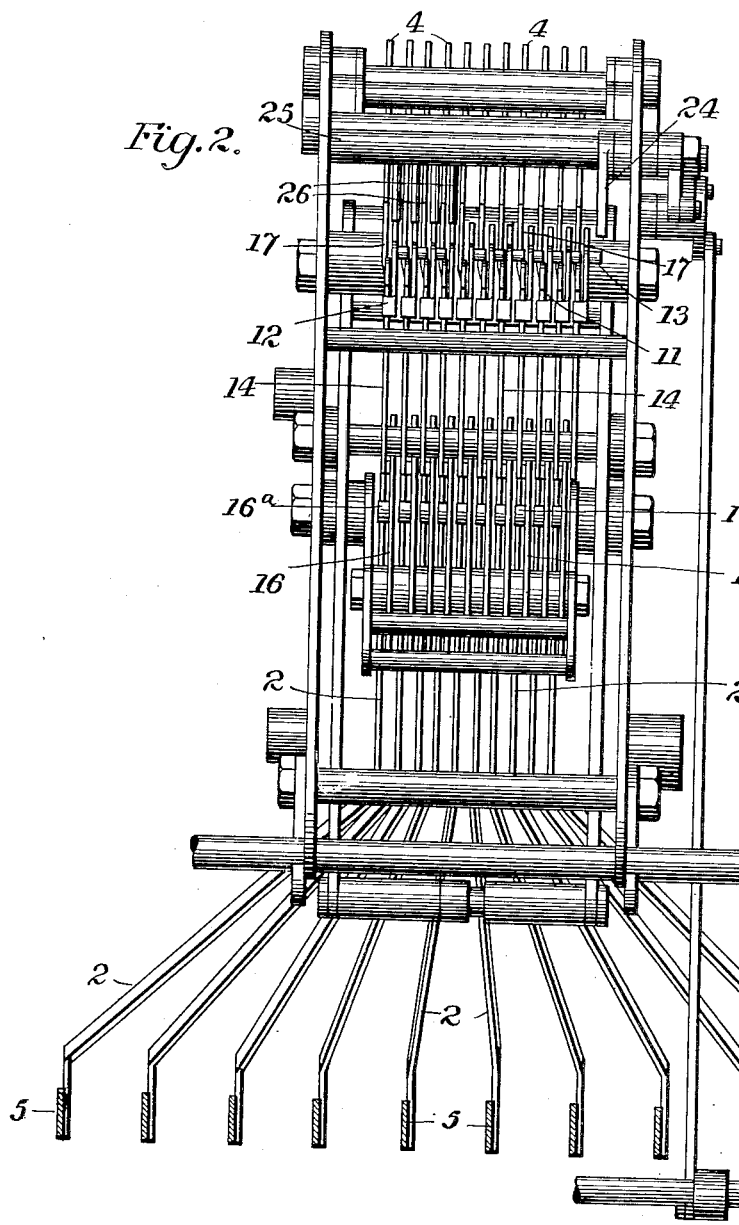

UNITED STATES PATENT OFFICE.

ARTHUR PENTECOST, OF ORANGE, NEW JERSEY, ASSIGNOR, BY MESNE ASSIGNMENTS, TO BURROUGHS ADDING MACHINE COMPANY, OF DETROIT, MICHIGAN, A CORPORATION OF MICHIGAN.

SPLIT-MACHINE.

1,126,851.  Specification of Letters Patent.  Patented Feb. 2, 1915.

Application filed August 29, 1906.  Serial No. 332,504.

*To all whom it may concern:*

Be it known that I, ARTHUR PENTECOST, a subject of the King of England, and residing at Orange, Essex county, New Jersey, have invented certain new and useful Improvements in Split-Machines, of which the following is a specification.

The present invention relates to improvements in adding machines of that character which are adapted to successively record and accumulate a series of items and to record at the will of an operator the total or sum of previously accumulated items.

In certain compilations it is desired to accumulate and record in separate columns items of different character or having different significations and to effect, when operating the machine to take a total, a record of the total of a portion only of said columns while returning to zero or normal position the accumulating devices corresponding to all of the columns. Thus, for example, in using such a machine to ascertain the weight or value of a plurality of packages, such as bales of cotton, which packages are distinguished from each other by numbers, it is desirable to record in one or more columns the numbers of the packages, and in other columns, at the right of those aforesaid, the weight or value of each package. When operating the machine to record the total value or weight of the series of packages it is not desired to record the total of the numbers designating the several packages, because such total would be of no utility, but it is of course necessary that the accumulating devices which have been operated while recording the column of package designating numbers be returned to zero or normal position in order that they may be employed for subsequent operations. Therefore, means are provided for preventing the recording of a total in one or more selected columns while all of the accumulating devices are returned to zero or normal position, and the total of other columns is recorded.

The present invention relates to machines of the character described, which are styled "split machines"; and has for its particular object to adapt a machine of the general character of that illustrated and described in the patent of W. H. Pike Jr., No. 763,692 for use in the manner above described.

In the accompanying drawings: Figure 1 is a side elevation, partly broken away, of the recording devices of a Pike adding machine embodying the present invention; Fig. 1ª is a detail view of the means for shifting the accumulating devices relative to the actuating racks; Fig. 2 is an elevation, partly in section on the line 2—2 of Fig. 1; and Fig. 3 is a vertical sectional view through the machine.

The recording devices illustrated include a series of type carriers or segments 2 adapted to move about a suitable support to bring either of the plurality of type 3 carried by each segment over a platen 1 and beneath a hammer 4, there being one of such hammers for each type carrier or segment of the machine.

Each of the type carriers or segments 2 is connected at its lower end with a strip 5 that is adapted to actuate an accumulating device, and the extent of movement imparted to each strip 5 and segment 2 at every operation of the machine is determined by which one of a series of depressible keys 6, there being a row of such keys for every segment 2, is actuated.

With each of the strips 5 is connected a spring 30 (see Fig. 3) which tends to move the strip longitudinally and swing the connected type segment 2 over the platen. Normally the type carrying segments and strips are held in the positions shown in Figs. 1 and 3 by the action of a cam plate 31 on a swinging frame 32 having a bar 33 extending across the lower members of all the segments. When the shaft 34 carrying the cam 31 is rocked to release the swinging frame 32, the springs 30 operate to slide their respective strips 5 longitudinally, the extent of movement permitted each rack depending upon which of the series of keys 6 coöperating with said strip is depressed. The strips 5 are as shown in Fig. 3 each provided with a plurality of laterally projecting stops 35 which coöperate with the stems of the keys 6 to limit the movement of the strips under the influence of the springs 30.

At its forward end each of said strips carries a rack 9 which is adapted to engage a pinion 10 of one of the adding or accumulating wheels, which wheels are mounted in a swinging frame that is moved to and from a position where said pinions will engage the racks 9 at each operation of the machine.

By the reciprocation of the strips 5 the wheels of the accumulating devices will be rotated and the extent of rotation be indicated by the number or figure on the periphery of the wheel which is in alinement with a sight aperture or opening in the case within which the operating parts of the machine are inclosed. During the operation of the machine to accumulate and record items, the pinions 10 are held in their normal position, illustrated in Figs. 1 and 3, out of engagement with the racks during the forward movement of the strips 5 and racks 9 and moved into and retained in engagement with the racks as the latter and strips 5 move rearward. The movement of the frame carrying the adding wheels above referred to is effected through a cam plate 36 (see Fig. 1) mounted on a shaft 34 and having two projecting lugs between which extends a pin 51 on a lever 37 which is connected with a rod 38 that is attached to toggles 52, 53 connected to an arm 54 of said swinging frame.

Normally the pinions are out of engagement with the racks 9 and as the cam plate 36 is rocked the rear lug thereon contacts with the pin on lever 37, as the strips 5 reach the limit of their forward movement, and through the lever 37, the link 38 and toggle rocks the adding wheel frame to lower the pinions 10 into engagement with said racks. On the return movement of the shaft 34, while the cam 31 is returning the type segments and strips 5 to normal position, said pinions 10 will be moved distances corresponding respectively to the previous forward movements of said strips, and upon the completion of such rearward movement, the forward lug on the cam 36 will actuate the lever 37 to move the adding wheel frame in the opposite direction and release the pinions from engagement with the racks. When the total of a plurality of items is to be recorded, the pinions are moved into and retained in engagement with the racks during the forward movement of the latter whereby the pinions are reversely rotated until they are restored to their normal zero positions. If the pinions are disengaged from the racks at the completion of the forward movement of the latter, they will remain in their zero positions and the machine will be cleared or freed from all accumulations and be ready for a new series of operations. If, however, the pinions be retained in engagement with the racks during the rearward movement thereof the adding wheels will be returned to position to again indicate the sum of the previously accumulated items and the total recorded by such an operation of the machine is termed a "sub-total" key 7 or "total" key 8 is actuated. tal" recorded when the machine is cleared.

The movements of the swinging frame carrying the adding wheels and pinions necessary to secure the record of a "sub-total" or "total" as desired are controlled respectively in the machine illustrated by two special keys 7, 8.

Connected to a pivotally mounted plate 39, Fig. 1, is a hook adapted to engage the aforesaid pin on lever 37. A link 41 connects said hook 40 with a lever 50, across the upper edge of which project pins 7ª, 8ª, connected respectively with the sub-total key 7 and total key 8. When either of said keys 7, 8, is depressed the notch in the hook 40 will receive the pin 51 of the lever 37 and as the plate 39 is rocked during the first half of the movement of the shaft 34, the pinions 10 will be moved into engagement with the racks 9 as the strips 5 move forward, and said pinions will thus be turned in a reverse direction from that in which they were moved while accumulating. If the key 8 is depressed the arm 36ª of the cam 36 will at the commencement of the return movement of shaft 34 engage a dog 39ª on the plate 39 and swing the latter in the reverse direction, thus moving the adding pinions out of engagement with the racks 9 as the strips 5 are returned to normal position by the cam 31. If the sub-total key 7 is depressed the hook 40 will be engaged with the lever 37, as before described, so that the pinions and rack will be engaged during the forward movement of the strips, but the dog 39ª will be shifted by the lever 42, with which the pin 7ª of said sub-total key coöperates, out of the path of the arm 36ª and therefore the pinions and racks will remain in engagement throughout the movement of the strips 5 and consequently said pinions will not be left in their zero position but will show the sum of previously accumulated items.

As the present invention relates particularly to the recording mechanism it will be unnecessary to further describe the operation of the adding mechanism.

The hammer associated as aforesaid with each segment or type carrier 2 comprises a body 4 and a separately formed tail piece 11 which is provided at its free end with a lip 12 and with a removable pin or stud 13, said pin and lip extending in opposite directions from the tail piece as shown in Fig. 2. The lip 12 of each hammer is engaged by the hook of a detent shown as a lever 14 pivoted at 15 and with which coöperates a pivotally mounted, spring actuated catch 16. Said catches 16 are mounted in a swinging frame, which at each operation of the machine moves so as to draw downwardly on said catches and thereby rock the detents 14 engaged therewith out of engagement with the lips 12 of the printing hammers. Suitable springs connected with the tails of the hammers act to drive the latter against the type 3 beneath them when the detents 14 thereof are thus released. To prevent confusion, said springs are not shown in Fig. 2.

The detents 14 will only be released in the manner described when one of the keys 6 of the row of such keys associated with the hammer 4 controlled by said detent has been depressed and the segment 2 correspondingly adjusted. The detent corresponding to rows of keys 6 in which no key has been depressed will not be released in the manner described, but the catches 16 controlling said detents will be moved out of engagement therewith, as their swinging frame is moved, by contact of studs 16ª thereon with projections 2ª on those segments 2 which remain in normal position.

In order that ciphers may be printed at the right of the column or columns in which a figure or figures are printed at any operation of the machine each detent 14 is provided with an upwardly extending finger 17 that as shown in Figs. 1 and 2 extends across the path of and into position to be operated by the stud or pin 13 of the hammer of the next higher denomination of the recorder.

The recording devices illustrated include ten segments 2 and eleven hammers and coöperating detents and latches, the right hand hammer operating a special type 21 when a total is recorded and being held elevated and prevented from operating at other times by the engagement of a dog 24 (Figs. 1 and 2) with the pin 13 of its controlling detent, said dog being connected with devices so as to be operated when either the "sub-total" to distinguish it from the "to- The construction and operation of the means employed to split said recording devices into sections adapted to operate independently and record items of different nature or character will now be described.

Referring to Fig. 2 it will be seen that the dog 24 controlling the operation of the special type hammer is carried by a rock shaft 25 that extends transversely across the recorder, being suitably journaled in the side plates of the supporting frame; and in said shaft are formed a series of internally threaded sockets adapted to receive stop pins 26 of such length that, when the shaft 25 is rocked to move the dog 24 to operative position the pins 26 will extend into the path of the hammer tails 11 in alinement therewith and prevent the corresponding hammers 4 from falling upon the type 3 beneath them. It will be understood that there will be as many stops 26 employed as desired and the number and arrangement thereof will be varied in accordance with the particular character of work to be performed. In the embodiment of the invention illustrated there are four of said pins arranged at the left hand side of the recording devices and the latter is therefore split or separated into two sections both adapted to record items but the left hand section of which cannot be operated to record a total.

In order that the sections of the recorder may be entirely independent and that there will be no printing of ciphers in the right hand section due to the operation of the right hand pin 13 of the left hand section this pin is removed so that there is no connection whatever between the two sections.

Normally, or when the machine is being operated to record items, the pins or stops 26 are in alinement with recesses or notches 27 formed in the upper edges of the hammer tails 11 so that they offer no obstruction to the upward movement of said tails necessary to bring the bodies 4 of the hammers against the type 3. When however the shaft 25 is rocked, as it is whenever a total taking operation is effected, the stops 26 are brought over the section of the hammer tails, above the pins 13, and thereby the hammer sections 4 are prevented from moving downward sufficiently far to strike the type.

By removing the stops 26 and replacing the pin 13 in the right hand hammer of the left hand section the machine will be adapted to operate in the usual manner and with its full capacity.

Having thus described the invention, what is claimed is:

1. The combination with recording devices including a plurality of type carriers, a plurality of duplicate hammers corresponding in number to and coöperating with type carriers, and means for causing each hammer to operate type in its associated carrier, of means adapted to prevent such action of one or more of the hammers and comprising a plurality of independently adjustable devices, one for each hammer to be affected, and means for simultaneously moving all of said devices to and from operative position.

2. The combination with recording devices including a plurality of type carriers, a plurality of duplicate hammers corresponding in number to and coöperating with type carriers, and means for causing each hammer to operate type in its associated carrier, of means adapted to prevent such action of one or more of the hammers and comprising a plurality of independently adjustable stops, each adapted to be independently adjusted into alinement with a member of any of the hammers, and means for simultaneously moving all of said stops to and from operative position.

3. In an adding and recording machine, the combination of adding devices, recording devices comprising a plurality of type carriers and a hammer coöperating with each of said carriers, a supplemental type carrier and hammer therefor adapted to be actuated when a total is recorded, a stop normally preventing actuation of the hammer for the supplemental type carrier, stop devices adapted to coact with one or more of the hammers to prevent action thereof, and means for simultaneously rendering said stop devices operative and withdrawing the aforesaid stop controlling the hammer for the supplemental type carrier preliminary to actuating the recording devices to record a total.

4. In an adding and recording machine, the combination with accumulating devices, of a platen, a plurality of type carriers movable relatively to the platen, a hammer adapted to coöperate with each type carrier and provided with a laterally projecting removable member adapted to coöperate with means controlling actuation of the hammer of next lower order in the series, a rock shaft extending transversely of the hammers, a plurality of stops each adapted to be independently attached to said shaft in alinement with any of the hammers, and means for actuating the shaft to position said stops to prevent the alined hammers from actuating their associated type.

5. In an adding and recording machine, the combination with accumulating devices, of recording devices including a plurality of type carriers and a hammer coöperating with each carrier, a supplemental special recording means, a stop normally preventing operation of the supplemental recorder, a plurality of independently adjustable stops each adapted to be positioned to prevent any one of the hammers from actuating its associated type, a total key, and means whereby on actuating said key all of said stops will be shifted, for the purpose described.

6. In an adding and recording machine, the combination with accumulating devices, of recording devices including a plurality of type carriers and a hammer coöperating with each carrier, a supplemental special recording means, a stop normally preventing operation of the supplemental recorder, a plurality of independently adjustable stops each adapted to be positioned to prevent any one of the hammers from actuating its associated type, a rock shaft controlling the position of all said stops, and a total key connected with said shaft, whereby when the key is actuated the stop controlling the special recording device will be rendered inoperative and the other stops will be rendered operative, for the purpose described.

In testimony whereof I affix my signature in presence of two witnesses.

ARTHUR PENTECOST.

Witnesses:
  A. F. HENDERSHOT,
  CHARLES R. WILMAT.